United States Patent

Humble et al.

(10) Patent No.: US 9,436,436 B2
(45) Date of Patent: Sep. 6, 2016

(54) SELF-CORRECTING RANDOM NUMBER GENERATOR

(71) Applicant: UT-Battelle, LLC, Oak Ridge, TN (US)

(72) Inventors: Travis S. Humble, Knoxville, TN (US); Raphael C. Pooser, Knoxville, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 304 days.

(21) Appl. No.: 14/178,863

(22) Filed: Feb. 12, 2014

(65) Prior Publication Data

US 2015/0227343 A1 Aug. 13, 2015

(51) Int. Cl.
*G06F 7/58* (2006.01)
*G06N 99/00* (2010.01)

(52) U.S. Cl.
CPC ............. *G06F 7/588* (2013.01); *G06N 99/002* (2013.01)

(58) Field of Classification Search
CPC ........................................................ G06F 7/588
USPC ........................................................ 708/255
See application file for complete search history.

(56) References Cited

U.S. PATENT DOCUMENTS

| | | | | |
|---|---|---|---|---|
| 6,539,410 B1 * | 3/2003 | Klass | ...................... | G06F 7/588 708/255 |
| 7,428,562 B2 | 9/2008 | Beausoleil et al. | | |
| 7,472,148 B2 | 12/2008 | Simon et al. | | |
| 7,844,649 B2 * | 11/2010 | Fiorentino | ............. | B82Y 10/00 708/255 |
| 7,849,121 B2 | 12/2010 | Fiorentino et al. | | |
| 7,849,122 B2 | 12/2010 | Fiorentino et al. | | |
| 8,130,950 B2 | 3/2012 | Dolgunov et al. | | |
| 8,554,814 B2 * | 10/2013 | Qi | ........................... | G06F 7/588 708/255 |
| 8,949,300 B2 * | 2/2015 | Tanaka | .................. | H04L 9/0852 380/256 |
| 2008/0076525 A1 | 3/2008 | Kim | | |
| 2012/0084242 A1 | 4/2012 | Levin | | |

FOREIGN PATENT DOCUMENTS

| | | |
|---|---|---|
| CN | 102508634 A | 6/2012 |
| GB | 2457328 B | 11/2011 |

OTHER PUBLICATIONS

Fiorentino, M. et al, "Secure self-calibrating quantum random bit generator," APS/123-QED, Feb. 1, 2008, pp. 1-6.
Wayne, M. et al, "Low-bias high-speed quantum random number generator via shaped optical pulses," Optics Express, vol. 18, No. 8, Apr. 12, 2010, pp. 9351-9357.

* cited by examiner

*Primary Examiner* — Chuong D Ngo
(74) *Attorney, Agent, or Firm* — Warner Norcross & Judd LLP (57) ABSTRACT

A system and method for generating random numbers. The system may include a random number generator (RNG), such as a quantum random number generator (QRNG) configured to self-correct or adapt in order to substantially achieve randomness from the output of the RNG. By adapting, the RNG may generate a random number that may be considered random regardless of whether the random number itself is tested as such. As an example, the RNG may include components to monitor one or more characteristics of the RNG during operation, and may use the monitored characteristics as a basis for adapting, or self-correcting, to provide a random number according to one or more performance criteria.

19 Claims, 4 Drawing Sheets

SELF-CORRECTING RANDOM NUMBER GENERATOR

STATEMENT REGARDING FEDERALLY SPONSORED RESEARCH AND DEVELOPMENT

This invention was made with government support under Contract No. DE-AC05-00OR22725 awarded by the U.S. Department of Energy. The government has certain rights in the invention.

FIELD OF THE INVENTION

The present invention relates to the field of random number generation, and specifically to the generation of true random numbers based on quantum mechanics.

BACKGROUND OF THE INVENTION

Random numbers have been used in many applications as a source of independent and unpredictable numbers. In practice, a device known as a random number generator (RNG) may provide these numbers, which may be evaluated to determine a degree of randomness. The randomness of the number (or a sequence of numbers) is often times quantified using tests of randomness to evaluate statistical quantities, such as frequency, repetition, and correlations. The results of these randomness tests may be compared to expected values to determine whether the random number is sufficiently random, and if the random number or sequence fails any of these tests, additional mathematical techniques, such as distillation, may be used to modify the random number or sequence into a more random form.

As noted above, the random numbers generated from RNGs may be tested after they have been generated. Conventionally, the testing for each sequence of numbers is performed independent of the RNG, and independent of each other. In other words, if a sequence of numbers generated from the RNG fails a test for randomness, this failure does not affect whether a subsequent sequence of numbers passes or fails the same test for randomness. Whether each sequence of numbers generated from the RNG passes or fails a test for randomness is not known by the conventional RNG prior to being generated. For example, in the case of a conventional pseudo-random number generator (PRNG), which may employ a mathematical algorithm for generating sequences of numbers that demonstrate a high degree of randomness, the randomness of a sequence produced by these algorithms may not be provable before the sequence is actually generated. Each sequence of numbers generated from the PRNG may be tested after it has been generated using one or more tests as noted above, but whether that sequence of numbers, before being generated, passes or fails the one or more tests is not known.

In recent times, so-called true random number generators (TRNGs) have been used instead of PRNGs in a variety of applications. A TRNG may rely on the uncertainty inherent to certain chaotic and quantum physical systems rather than the algorithmic definitions of randomness used in conventional PRNGs. In other words, the TRNG may draw on the lack of knowledge about the underlying physical state embodied by a device. An example of a conventional TRNG is based on a quantum physical system in which the tenants of quantum mechanics may provide a prescriptive definition for the absence of knowledge about a quantum system. For purposes of disclosure, a TRNG derived from a quantum physical system is referred to as a quantum random number generator (QRNG).

A conventional QRNG may generate a number using a two-step process: (1) preparation of a quantum physical system in a desired quantum statistical distribution followed by (2) measurement of the quantum physical system to yield numerical results. According to quantum theory, it may be possible to predict that the uncertainty of the measurement outcome is improved, and possibly maximized, when the quantum system is prepared as a superposition of the possible measurements; the measurement projects the prepared system into an outcome that may be proportional to its prepared amplitude. Multiple uses of the QRNG may then yield a sequence of numbers that can be subjected to tests of randomness. In principal, preparing the quantum state in perfect superposition, and conducting a measurement perfectly aligned with the quantum preparation may yield maximum entropy or randomness. In practice, there may be deviations from this ideal, such as a nonpure quantum preparation or a misaligned measurement. Measurement misalignments may include both physical and mathematical misalignments.

As an example, when the quantum statistical distribution of the prepared quantum system corresponds to an equal superposition of the possible measurement outcomes, the probabilistic measurement process may ensure that the outcomes are maximally random. In practice, however, the quantum system may be prepared with some bias that favors one or more outcomes over the others. These biases may correspond to deviations in the quantum statistical distribution of the prepared quantum system, which conventional QRNGs overlook. As a result, the random numbers generated from QRNG, like the PRNG and other conventional RNGs, are tested after they have been generated and independent of the random number generator, itself. In other words, the randomness of the output from the conventional RNGs described above, including the TRNGs and QRNGs, may not be known beforehand, or before the random number is actually generated.

SUMMARY OF THE INVENTION

The present invention provides a system and method for generating random numbers. The system may include a random number generator (RNG), such as a quantum random number generator (QRNG), configured to self-correct or adapt in order to substantially achieve randomness from the output of the RNG. By adapting, the RNG may generate a random number that may be considered random regardless of whether the random number itself is tested as such. As an example, the RNG may include components to monitor one or more characteristics of the RNG during operation, and may use the monitored characteristics as a basis for adapting, or self-correcting, to provide a random number according to one or more performance criteria.

A RNG according to one embodiment may use quantum statistical tests of randomness as a basis for adapting. These tests may evaluate a variety of factors, such as the quantum statistical mean or the quantum statistical distribution, or a combination thereof. Because the RNG may have design-specific quantum statistics, these tests may provide corrective information for tuning the RNG to meet its designed performance criteria. And, by incorporating one or more of these tests into the RNG, the RNG may be adaptive or self-correcting in the sense that it may monitor its own accuracy to generate random numbers.

In one embodiment, an adaptive random number generator may include a quantum preparation unit configured to generate one or more quantum physical entities, the quantum preparation unit may include a quantum preparation control unit configured to control, based on feedback, one or more operating parameters of the quantum preparation unit to affect generation of the one or more quantum physical entities. The adaptive random number generator may include an analysis unit operably coupled to the quantum preparation unit, the analysis unit being configured to generate the feedback based on an evaluation of the quantum preparation unit. The analysis unit may include at least one of a quantum interrogation stage and a testing stage.

In one embodiment, a self-correcting true random number generator (STRNG) may include a number generator configured to generate a sequence of numbers, the number generator includes a control unit configured to control, based on feedback, a statistical distribution of the generated sequence of numbers. The STRNG may also include an analysis unit operably coupled to the number generator, the analysis unit being configured to monitor the number generator to provide the feedback to the number generator, where the feedback is indicative of a deviation in an observed statistical distribution for the generated number sequence from an expected statistical distribution.

In one embodiment, a self-correcting quantum random number generator (SCQRNG) may include a quantum preparation unit configured to generate one or more quantum physical entities, the quantum preparation unit including a quantum preparation control unit configured to control one or more operating parameters of the quantum preparation unit. The SCQRNG may also include an analysis unit operably coupled to the quantum preparation unit, the analysis unit being configured to conduct a plurality of weak-measurements on the one or more quantum physical entities, wherein the analysis unit determines a quantum statistical mean based on the plurality of weak-measurements. In one embodiment, the SCRQNG may be configured to post-select one or more of the weak-measurements to determine a quantum statistical mean. In one embodiment, the analysis unit may be configured to tomographically reconstruct a quantum statistical distribution of the quantum physical entities.

In one aspect, a method according to one embodiment may include generating one or more quantum physical entities, and interrogating the one or more quantum physical entities to generate feedback indicative of a deviation in a quantum statistical distribution of the quantum physical entities from an expected statistical distribution. The method may also include adjusting an operating parameter based on the feedback, wherein the operating parameter affects generation of the one or more quantum physical entities.

In one aspect, a system and method according to one embodiment may include a random number generator, such as a true random number generator, that may provide a trustworthy component for validating that generated numbers are indeed random and that the component is operating within design specifications. The self-correcting or adaptive features of the random number generator may enable the random number generator to recover from both inadvertent as well as intentional applied biases or component imperfections that may otherwise skew the generated output. The randomness of the generated numbers may therefore be assured with a higher level of confidence that may carry over to downstream applications. A variety of applications are envisaged, including, for example, communication and computer security, cryptographic services, scientific simulation, financial analysis, electronic commerce, statistical analysis, and lottery, gambling, and other games of chance.

These and other objects, advantages, and features of the invention will be more fully understood and appreciated by reference to the description of the current embodiment and the drawings.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

DESCRIPTION OF THE CURRENT EMBODIMENT

A system according to one embodiment may include a RNG configured to adapt, based on one or more monitored characteristics, to provide a random number that may be considered random according to one or more tests. Feed forward or feedback control methodologies, or a combination thereof, may be implemented in the system to control one or more operating parameters of the RNG, thereby affecting the output of random numbers. Put differently, by controlling an operating parameter based on a monitored characteristic, the RNG may adapt or self-correct to potentially achieve improved entropy in the output of random numbers. For purposes of disclosure, an adaptive RNG is described according to one or more embodiments using a quantum random number generator (QRNG). However, it should be understood that embodiments described herein are not limited to a quantum random number, and that feed forward control or feedback control, or a combination thereof, may be used in connection with any type of random number generator.

A. Overview

Figure 1:
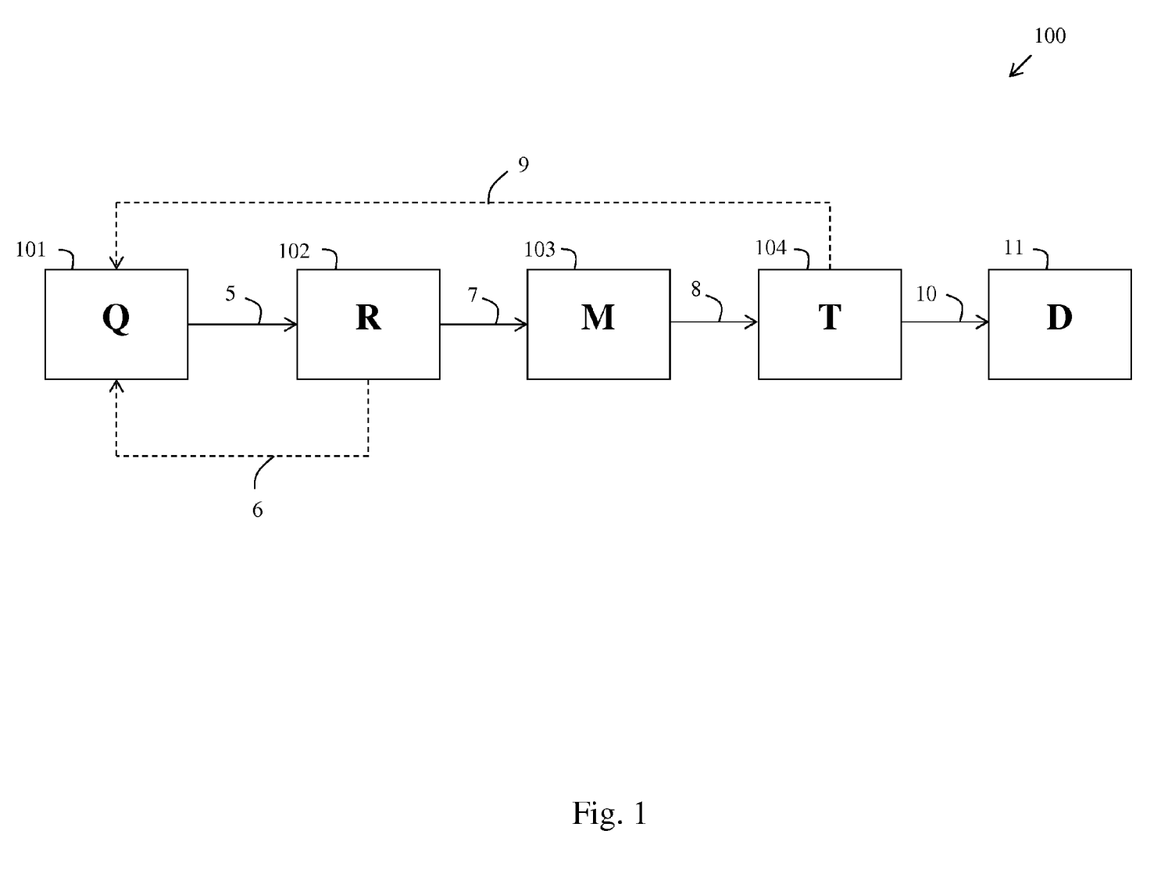
FIG. 1 is a representative view of a QRNG according to one embodiment.

A QRNG for generating random numbers in accordance with one or more embodiments is shown in FIG. 1, and generally designated 100. As set forth below, the QRNG 100 may generate random numbers that are based on the physics of quantum mechanics and that satisfy one or more performance criteria. The QRNG 100 may include one or more of the following: a quantum preparation stage 101, a quantum interrogation stage 102, a measurement stage 103, and a testing stage 104.

The quantum preparation stage 101 may include an output 5 capable of providing a quantum physical entity. For purposes of disclosure, the quantum preparation stage 101 is described as a source of photons, such as a laser, which may output photons exhibiting random behavior; however, it should be understood that the embodiments described herein are not limited to use of a photon-based quantum preparation stage, and that any type of quantum preparation stage may be incorporated, including, for example, solid-state or semiconductor quantum preparation stages.

The quantum interrogation stage 102 may be configured to monitor the quantum statistics of the quantum physical entity output from the quantum preparation stage 101, and to provide interrogation-stage feedback 6 indicative of deviations in the quantum statistics from one or more criterion. Based on the interrogation-stage feedback 6, the quantum preparation stage 101 may adjust one or more operating parameters in an effort to output a quantum physical entity that satisfies the one or more criterion. By adjusting the one or more parameters, the output 5 of the quantum preparation stage 101 may be adjusted to satisfy the one or more criterion. And, by satisfying the one or more criterion, a random number based on the quantum physical entity from the output 5 may be known to a degree of certainty, and without being tested, to ultimately satisfy one or more tests of randomness, such as a substantial lack of bias.

The quantum interrogation stage 102 may be configured to determine whether the output 5 satisfies one or more criterion. In one embodiment, the quantum interrogation stage 102 may employ quantum statistical tests of randomness on the quantum physical entity output from the quantum preparation stage 101, and provide interrogation-stage feedback 6 to the quantum preparation stage 101 indicative of a deviation between the monitored quantum statistical distribution and the expected quantum statistical distribution. For purposes of disclosure, the one or more tests may include, for example, quantum tomography, weak measurements, weak sampling, and model updating, such as maximum likelihood estimators; however, it should be understood the quantum interrogation stage 102 is not limited to these tests and that any type of test according to one or more criterion may be used. The testing phase may occur in interrogating the one or more physical entities, such as in the interrogating step 404 described with respect to the method 400 herein in connection with the illustrated embodiment of FIG. 4. As an example, the quantum interrogation stage 102 may evaluate whether the quantum statistical distribution of the output 5 follows a binomial distribution. As will be described herein, the quantum interrogation stage 102, in a photon-based QRNG, may monitor the polarization angle of the photons output from the quantum preparation stage 101, and determine whether the statistical distribution of the polarization angles deviates from a binomial distribution.

Based on the interrogation-stage feedback 6 being indicative of a deviation from the expected quantum statistical distribution, the quantum preparation stage 101 may conduct corrective action in an effort to achieve the expected quantum statistical distribution. For example, in an embodiment in which the quantum preparation stage 101 is a laser-based photon generator, the quantum preparation stage 101 may adjust one or more operating parameters of the laser, such as power supply current, power supply voltage, polarization of photons, intensity, and wavelength, to achieve the expected quantum statistical distribution. In this way, the output 5 from the quantum preparation stage 101 may be controlled based on feedback to generate a quantum physical entity having a quantum statistical distribution that satisfies one or more criterion, such as meeting an expected quantum statistical distribution.

In one embodiment, the quantum preparation stage 101 may be configured to generate a quantum physical entity having an expected mean value, and the quantum interrogation stage 102 may be configured to conduct a weak-value measurement to recover the actual statistical mean for the quantum physical entity output from the quantum preparation stage 101. Weak-value measurements may enable the quantum interrogation stage 102 to obtain some information about the quantum stage of a quantum physical entity without perturbing or collapsing the quantum state. For example, the weak-value measurement conducted by the quantum interrogation stage 102 may indirectly measure the quantum statistical distribution from the output 5 of the quantum preparation stage 101, and produce a numerical estimate of the associated quantum statistical mean. Although a single weak-value measurement may provide a highly uncertain estimate for the mean or average of the quantum statistical distribution, a more precise estimate of the mean quantum statistical distribution may be obtained over an ensemble of weak-value measurements conducted on the output 5 of the quantum preparation stage 101. The interrogation-stage feedback 6 of the quantum interrogation stage 102 may be indicative of the mean of the quantum preparation stage 101 differing or deviating from a preselected value, or the mean passing one or more predetermined thresholds. As outlined above, the quantum preparation stage 101 may use the interrogation-stage feedback 6 as a basis for adjusting one or more operating parameters to affect the output 5, potentially resulting in correction such that the mean quantum statistical distribution of the output 5 satisfies the one or more criteria, such as the mean being at or near the preselected value, or the mean falling within the one or more predetermined thresholds.

In one embodiment, the quantum interrogation stage 102 may be configured to conduct continuous weak-value measurements on the quantum physical entity output from the quantum preparation stage 101. In this way, the quantum interrogation stage 102 may continuously track the quantum statistical distribution of the quantum interrogation stage 102. For example, the quantum interrogation stage 102 may continuously track the quantum statistical mean of the output 5, and provide interrogation-stage feedback 6 to the quantum preparation stage 101 indicative of the current quantum statistical distribution being output from the quantum preparation stage 101. The quantum preparation phase 101 may initiate or perform an adjustment to one or more operating parameters based on the interrogation-stage feedback 6 being indicative of the quantum statistical distribution failing to satisfy one or more criterion, such as the mean quantum statistical distribution being above or below a threshold.

In one embodiment, the interrogation stage 102 may sample the output 5 of the quantum preparation stage 101, and tomographically reconstruct the observed quantum statistical distribution of the quantum preparation stage 101. The tomographic reconstruction may be achieved by measuring selected instances of the output 5 of the quantum preparation stage 101 using a set of tomographic measurement configurations. Each measurement configuration may provide partial information about the output 5 provided from the quantum preparation stage 101. The partial information obtained from each measurement configuration may be synthesized to provide an estimate of the quantum statistical distribution of the quantum preparation stage 101. The interrogation stage 102 may provide interrogation-stage feedback 6 to the quantum preparation stage 101 based on this estimate of the quantum statistical distribution. For example, the interrogation-stage feedback 6 may be indicative of the estimate failing to satisfy one or more criterion, or indicative of the estimate, itself, such that the quantum preparation stage 101 may evaluate the interrogation-stage feedback 6 to determine whether to perform an adjustment to one or more operating parameters.

During the time period in which the interrogation stage 102 samples or monitors the output 5 of the quantum preparation stage 101 to tomographically reconstruct the observed quantum statistical distribution, the measurement stage 103 may not receive the output 5 from the quantum preparation stage 101. When the interrogation stage 2 is not sampling the output 5 from the quantum preparation stage 101, the measurement stage 103 may receive the output 5 for use as a basis for generating random digits. As will be discussed herein, numerical output 8 of the measurement stage 103 may be evaluated by the testing stage 104. In this embodiment, each series of numerical digits provided from the numerical output 8 may be appended for evaluation by the testing stage 104.

Turning now to the measurement stage 103 of the QRNG in the illustrated embodiment of FIG. 1, the measurement stage 103 may be configured to generate a numerical digit based on the quantum physical entity. As an example, the measurement stage 103 may utilize a 50/50 beam splitter, through which photons may randomly transmit or reflect, and two photon detectors to detect respectively transmitted and reflected photons. One photon detector may be positioned to detect photons that transmit through the beam splitter, and the other photon detector may be positioned to detect photons that reflect through the beam splitter. A numerical digit, such as a 0 or 1, may be generated based on which of the photon detectors actually detects the photon. It should be understood that this is an example embodiment of the measurement stage 103, and that any type of measurement stage 103 may be implemented to translate a random property of the quantum physical entity output from the quantum preparation stage 103 to a numerical digit. As another example, the timing of photons detected by a photon detector may be used as a basis for generating a digit. In other words, time-to-digital converter techniques implemented by the measurement stage 103 may translate random detection times of photons to a digital number.

In the illustrated embodiment of FIG. 1, the testing stage 104 of the QRNG 100 may be configured to evaluate the distribution of numerical digits output from the measurement stage 103, and to provide a numerical output 10. As depicted in the illustrated embodiment of FIG. 1, the numerical output 10 is provided to an input of an external device 11, but it should be understood that the numerical output 10 may be coupled to any type of input capable of receiving information related to numerical digits, including, for example, inputs external or internal to the QRNG 100. Additionally, it should be understood that the testing stage 104 may be absent from the QRNG 100 such that the numerical digit generated and output from the numerical output 8 of the measurement stage 103 may be provided to an input external or internal to the QRNG 100.

The testing stage 104 may provide testing-stage feedback 9 to the quantum preparation stage 101 indicative of deviations in the distribution of numerical digits from one or more criterion. For example, the testing stage 104 may conduct a classical statistical distribution analysis of the numerical digits to potentially detect bias, or a tendency of the numerical digits to lean toward one digit or another rather than being a truly random distribution. Based on the classical distribution analysis, the testing stage 104 may indicate via testing stage feedback 9 that the numerical digits deviate from one or more criterion. And, in response to testing stage feedback 9, the quantum preparation stage 101 may adjust one or more operating parameters that affect the output 5 of quantum physical entities, ultimately affecting the output of numerical digits. In this way, the QRNG 100 may adapt itself to generate numerical digits potentially satisfying the one or more criterion of the testing stage 104. Although the illustrated embodiment of FIG. 1 is described in connection with feedback from both the quantum interrogation stage 102 and the testing stage 104, it should be understood that one of quantum interrogation stage 102 and the testing stage 104, without the other, may be included in the QRNG 100, as illustrated by phantom lines in FIG. 1.

In one embodiment, weak-measurements of the interrogation stage 102 may be evaluated in conjunction with measurements in the testing stage 104 such that tests of randomness on a series of numerical digits may be correlated with the weak-measurements of the interrogation stage 102 for one or more quantum physical entities that form the underlying basis for the series of numerical digits, or correlated with the weak-measurements obtained during the same or similar time-frame in which the quantum physical entities resulted that form the underlying basis for the series of numerical digits. A variety of tests may be conducted on this information to provide feedback, such as testing-stage feedback 9 or interrogation stage feedback 5, or both, to the quantum preparation stage 101. For example, a bias detected in a sequence of numbers by testing stage 104 may be compared to the quantum statistical distribution developed by the quantum interrogation stage 102 based on the underlying quantum physical entities for the sequence of numbers. If there is also a bias in the quantum statistical distribution, the QRNG 100 may determine to adjust an operating parameter in the quantum preparation stage 101. If there is bias detected in one but not the other of the quantum interrogation stage 102 and the testing stage 104, the QRNG 100 may determine to adjust one or more parameters of the measurement stage 102, or one or more parameters of other components, or a combination thereof. Thus, it should be understood that embodiments described herein are not limited to adjusting one or more operating parameters of the quantum preparation stage 101, and that one or more operating parameters of any component of the QRNG 100 may be adjusted based on monitored conditions.

In addition to, or alternative to this embodiment, the interrogation stage 102 may select weak-value measurement results for evaluation based on the output of the measurement stage 103. These post-selected weak-value measurements may be used as a basis for obtaining a more precise estimate of the quantum statistical mean, and for potentially reducing the number of weak-measurements to achieve an estimate. In this way, the output from the interrogation stage 102 may be fed forward to the measurement stage 103, which may adjust one or more operating parameters accordingly to account for potential deviations in the quantum statistical mean.

B. Weak-Value Measurements

Figure 2:
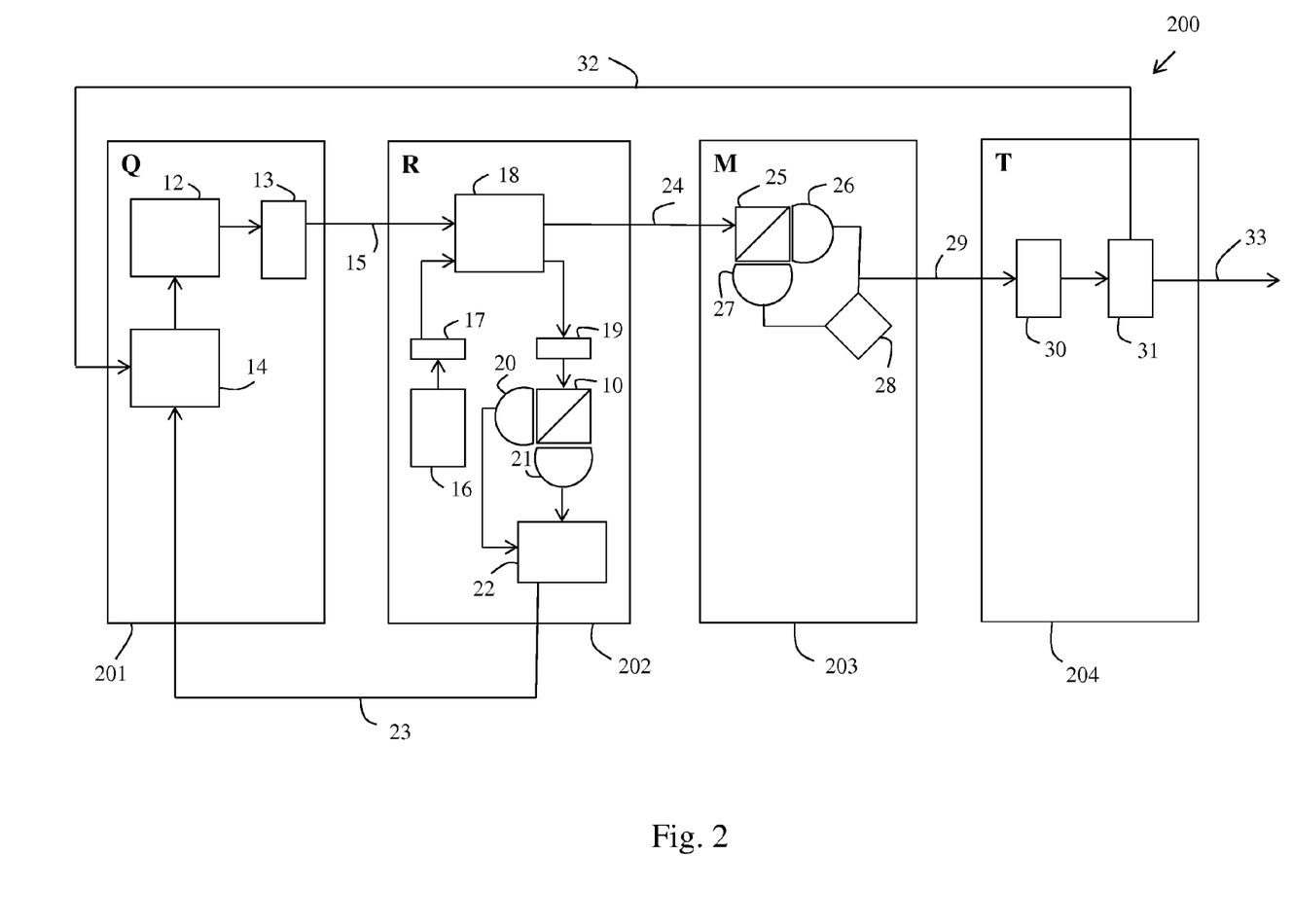
FIG. 2 is a representative view of a QRNG according to one embodiment.

Referring now to FIG. 2, one embodiment of a QRNG is shown, and generally designated 200. The QRNG 200 may be similar to the QRNG 100 described with respect to the illustrated embodiment of FIG. 1, and may include a quantum preparation stage 201, an interrogation stage 202, a measurement stage 203, and a testing stage 204, respectively similar to the quantum preparation stage 101, the interrogation stage 102, the measurement stage 103, and testing stage 104.

In the illustrated embodiment of FIG. 2, the QRNG 200 may include a quantum preparation stage 201 configured to generate polarized photons, and an interrogation stage 202 configured to conduct a weak-valued measurement. The quantum preparation stage 201 may include a photon source 12, such as a single photon source, configured to emit a linearly polarized photon that may be provided to a half-wave plate 13. The half wave plate 13 may be oriented to rotate the photon polarization by a polarization angle, such as 45°, and to provide the photon to a photon output 15 of the quantum preparation stage 201.

The quantum preparation stage 201 may also include a preparation control unit 14 capable of evaluating feedback obtained from one or more of the quantum interrogation stage 202 and the testing stage 204, and to adjust one or more operating parameters of the single photon source 12. For example, in an embodiment in which the photon source 12 is a laser, the power supply to the laser may be adjusted to affect the photons output therefrom. Example operating parameters includes the power supply current, power supply voltage, polarization angle, intensity, and wavelength.

The interrogation stage 202 may receive the photon output 15 from the quantum preparation stage 201, and direct the photon to a weak-value measurement system 18. In the illustrated embodiment, the quantum interrogation stage 202 may include a photon source 16, such as a single photon source, that emits a linearly polarized photon to a half wave plate 17, oriented to rotate the photon output from the photon source 16 by a parameterized angle gamma. The value of the angle gamma may be chosen to tune the strength of the weak-value measurement. The output of the halfway plate 17 may be transmitted to the weak-value measurement system 18 such that photons arrive coincident in time and space with the photons provided by the photon output 15 of the quantum preparation stage 201. To achieve coincidence, the photon source 16 may be tuned to output photons at substantially the same frequency and phase as the photon source 12 of the quantum preparation stage 201.

A first output from the weak-value measurement system 18 may be sent to a half wave plate 19, oriented to rotate the photon by a parameterized angle theta. The output from the half wave plate 19 may be directed to a polarized beam splitter 10. The beam splitter 10 may separate the linearly polarized components of a photon in order to allow measurement of the polarization angles of photons passing through the half wave plate 19. In other words, the beam splitter 10 may be configured to treat each polarization differently, reflecting photons having one polarization angle and transmitting photons having another polarization angle. This configuration may be achieved through the use of a dielectric material in the beam splitter 10. The linearly polarized components output from the beam splitter 10 may be transmitted to first and second photon detectors 20, 21. The photon detectors 20, 21 may be coupled to a statistical processing system 22 of the interrogation stage 202, which may be capable of serving as a comparator to identify which polarization component the photon detectors 20, 21 have detected. Based on the polarization components detected, the statistical processing system 22 may compute a quantum statistical mean of the Stokes operator:

$$\hat{S}=|h\rangle\langle h|-|v\rangle\langle v|$$

The interrogation-stage feedback 23 may be provided to the quantum preparation stage 201 based on the analysis conducted by the statistical processing system 22. As mentioned herein, feedback received by the quantum preparation stage 201 may be directed to the preparation control unit 14, which may evaluate feedback to determine whether to adjust one or more operating parameters of the photon source 12. For example, if the quantum statistical mean, as indicated by the interrogation-stage feedback 23, fails to satisfy one or more criterion, the preparation control unit 14 may provide a control output to adjust one or more operating parameters of the photon source 12. As another example, the preparation control unit 14 may evaluate the interrogation-stage feedback 23 to determine if the quantum statistical mean deviates from a desired statistical mean, or if the quantum statistical mean falls above or below a threshold, and if so, may provide a control output to adjust one or more operating parameters of the photon source 12. In this way, the preparation control unit 14 may control the photon source 12, based on feedback, to potentially achieve a photon output 15 having a quantum statistical mean that satisfies one or more criterion.

A second output of the weak-value measurement system 18 may be directed to an interrogation stage output 24, and further directed to the measurement stage 203. In the illustrated embodiment of FIG. 2, the measurement stage 203 may include a polarization beam splitter 25, at least two photon detectors 26, 27, and a signal comparator 28. The polarization beam splitter 25 may separate the linearly polarized components of photons output from the interrogation stage output 24, which, as described above, may be aligned to 45°. Accordingly, whether a photon reflects or transmits through the beam splitter 25 may be substantially random. The beam splitter 25 may transmit to one of the at least two photon detectors 26, 27, which may be configured as single photon detectors. The outputs from the photon detectors 26, 27 may be provided to the signal comparator 28 for evaluation of which polarization component has been detected. The detected polarization component may be encoded as a binary digit, and provided to the numerical output 29 of the measurements stage 203.

In one embodiment, because the weak-measurement system 18 may nudge the polarization angle of the photons, bias may be present in the numerical output provided by the measurement stage 203. Accordingly, the testing stage 204 may evaluate the numerical output, and provide feedback indicative of the bias introduced by the weak-measurement system 18 to the quantum preparation stage 101. Based on this feedback, the quantum preparation stage may adjust the polarization angle of the output 5 to potentially account for the nudge introduced by the weak-measurement system 18.

In the illustrated embodiment of FIG. 2, the testing stage 204 of the QRNG 200 may receive the numerical output 29 from the measurement stage 203, and evaluate the numerical output 29 according to one or more testing-stage criterion. As depicted, the testing stage 204 may include a memory buffer 30 and a statistical testing system 31 configured to provide testing stage feedback 32 to the quantum preparation stage 201. The memory buffer 30 may receive numerical output 29 from the measurement stage 203, and buffer numerical information for analysis by the statistical testing system 31. For example, a parameterized number, n, of binary digits may be buffered in the memory buffer 30 prior to statistical processing by the statistical testing system 31, which may employ one or more tests of randomness to evaluate the classical statistical distribution of the generated random numbers. The results of these tests, or information related to the results of these tests, may be provided to the preparation control unit 14 of the quantum preparation stage 201 via the testing stage feedback 32. As mentioned herein, feedback received by the quantum preparation stage 201 may be directed to the preparation control unit 14, which may evaluate the feedback to determine whether to adjust one or more operating parameters of the photon source 12. For example, if the testing stage feedback is indicative of bias in the numerical output 29, the preparation control unit may provide a control output to adjust one or more operating parameters of the photon source 12. Bias may be introduced by a variety of factors. For example, the interrogation stage 202 may introduce bias by nudging the photons. As another example, the polarization beam splitter 25 of the measurement stage 203 may be misaligned such that photons having a polarization angle 45° do not reflect or transmit in a substantially random manner. The testing stage 204 may provide feedback indicative of such a bias detected in the numerical output provided by the measurement stage 203. In response to such feedback, the quantum preparation stage 201 may adjust the polarization angle of photons being generated to account for misalignment in the polarization beam splitter 25. It should be understood that one or more parameters in addition to or alternative to polarization angle may be adjusted.

C. Tomographic Reconstruction

Figure 3:
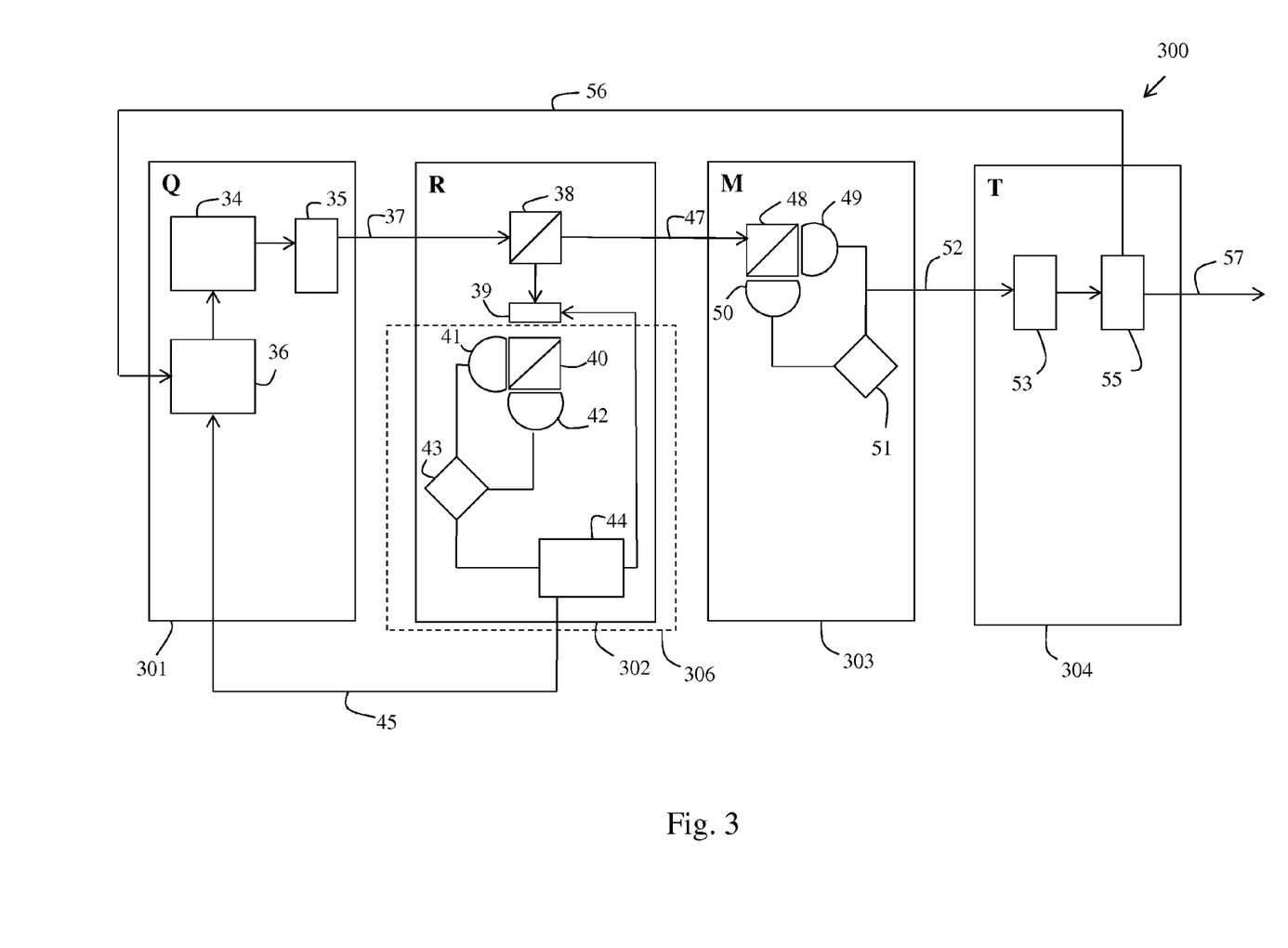
FIG. 3 is a representative view of a QRNG according to one embodiment.

Referring now to FIG. 3, one embodiment of a QRNG is shown, and generally designated 300. The QRNG 300 may be similar to the QRNGs 100, 200 described with respect to the illustrated embodiments of FIGS. 1 and 2, and may include a quantum preparation stage 301, an interrogation stage 302, a measurement stage 303, and a testing stage 304, respectively similar to the quantum preparation stage 101, 201, the interrogation stage 102, 202, the measurement stage 103, 203, and testing stage 104, 204, with several exceptions. For example, in the illustrated embodiment of FIG. 3, the QRNG 300 may include an interrogation stage 302 configured to conduct a tomographic reconstruction of the quantum statistical distribution output from the quantum preparation stage 301.

The quantum interrogation stage 302 may include one or more of the following: first and second 50-50 beam splitters 38, 40, a wave plate 39, first and second photon detectors 41, 42, a signal comparator 43, and a statistical processing system 44. The quantum interrogation stage 302 may direct the photon output 37 of the quantum preparation stage 301 to the first 50-50 beam splitter 38, which may reflect a photon to a first output coupled to an interrogation unit 306 of the quantum interrogation stage 302. The interrogation unit 306 may include one or more of the wave plate 39, the photon detectors 41, 42, the signal comparator 43, and the statistical processes 44. Within the interrogation unit 306, the wave plate 39 may be rotated or orientated to choose specific values of rotation that enable probing of the incoming photon. The statistical processing system 44 may hypothesize an expectation for incoming photons, and may control the rotation or orientation of the wave plate 39 accordingly to test the hypothesis. In this way, the statistical processing system 44 may implement a feed forward, recursive process to tomographically reconstruct a statistical distribution of the output 37 of the quantum preparation stage 301. After an incoming photon is rotated, the photon may be directed through the second 50-50 beam splitter 40.

From the second 50-50 beam splitter 40, a photon may either pass to the first photon detector 41 or the second photon detector 42, both of which may be single photon detectors. The comparator 43 may monitor which of the first and second detectors 41, 42 detects a photon, and communicate corresponding information to the statistical processing system 44. Over a series of measurements performed on an ensemble of generated photons, the statistical processing system 44 may collect data for reconstruction of a single-photon density matrix in the polarization basis. The results of this reconstruction may be analyzed by the statistical processing system 44 to identify biases in the quantum statistical distribution. Based on this analysis, the quantum interrogation stage 302 may provide interrogation-stage feedback 45 to the quantum preparation stage 301. The interrogation-stage feedback 45 may include information related to the analysis of the statistical processing system 44. For example, the interrogation stage feedback may relate to any bias detected by the statistical processing system 44.

A second output of the first 50-50 beam splitter of the quantum interrogation stage 302 may be directed to the measurement stage 302, which may be similar to the measurement stage 202 described in connection with the illustrated embodiment of FIG. 2. For example, the measurement stage 302 may include a beam splitter 38, first and second photon detectors 49, 50, and a signal comparator 51. The measurement stage 302 may provide a numerical output 52, which may be directed to the testing stage 304, which, similar to the testing stage 202, may include a memory buffer 53 and a statistical testing system 55, and may be configured to provide testing stage feedback 52 to the quantum preparation stage 301.

D. Method of Operation

A method of operating a QRNG according to one embodiment will now be described with respect to FIG. 4, and is generally designated 400. As described herein, a QRNG may include one or more components configured to allow the QRNG to adapt, or to adjust one or more operating parameters to affect a numerical output of the QRNG. For purposes of disclosure, the method 400 is described in connection with the illustrated embodiment of FIG. 1. However, it should be understood that the method 400 is not so limited, and that the method 400 may be implemented in connection with any type of QRNG.

Figure 4:
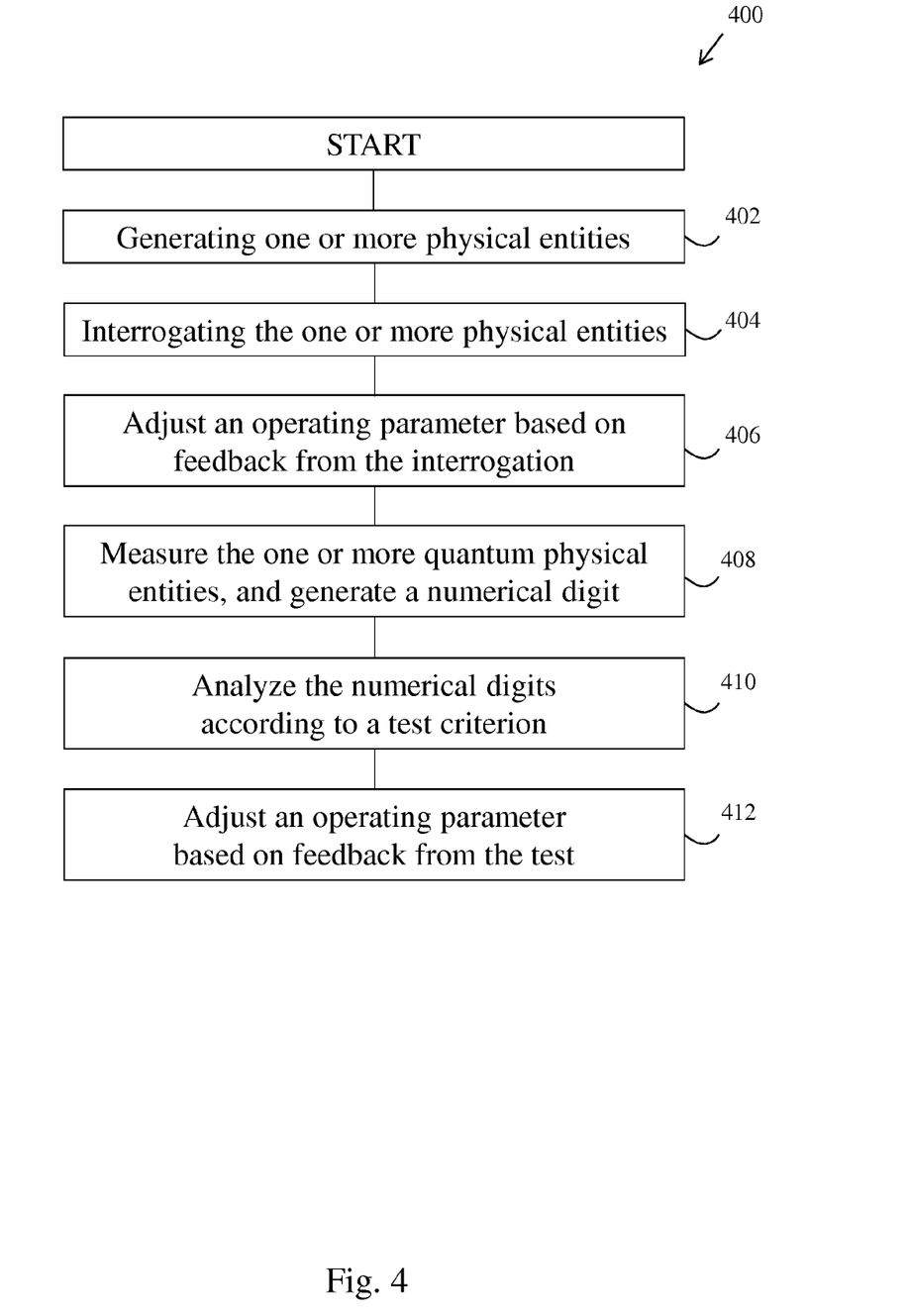
FIG. 4 is a method of operating a QRNG according to one embodiment.

In the illustrated embodiment of FIG. 4, the QRNG may generate random numbers based on the physics of quantum mechanics and based on feedback. The method may include generating or providing one or more quantum physical entities, such as one or more photons that exhibit random behavior. Step 402. It should be understood the method 400 is not limited to photon-based quantum preparation, and that any type of quantum physical entity may be used in connection with feedback to potentially satisfy one or more performance criterion.

The one or more quantum physical entities generated by the QRNG may be interrogated without collapsing the state of the quantum physical entities, such as by conducting a weak-value measurement of the quantum physical entities. The interrogation may provide information, including, for example, the quantum statistical distribution of the quantum physical entities or the mean quantum statistical distribution. This information may be evaluated according to one or more statistical criterion. Step 404. A single weak-value measurement may provide a highly uncertain estimate for the one or more statistical criterion, but, by obtaining multiple weak-value measurements, a more precise estimate (or an estimate sufficient for use as a basis for providing feedback to the QRNG to achieve one or more performance criterion) may be obtained. Example systems configured to conduct weak-measurements are described herein, and include, the weak-value measurement system 18 of the illustrated embodiment of FIG. 2 and the tomographic-based interrogation unit 306 of the illustrated embodiment of FIG. 3. As described herein, the weak-value measurement may be conducted continuously or intermittently.

Based on the weak-value measurement, the QRNG according to the method 400 may provide interrogation feedback to a quantum preparation control unit configured to control or affect an output of quantum physical entities. Based on the interrogation feedback, the quantum preparation control unit may adjust one or more operating parameters of the QRNG to affect the output of quantum physical entities. Step 406. In this way, the output of quantum physical entities may be known within a degree of certainty to satisfy the one or more statistical criterion.

The one or more quantum physical entities may be measured to generate a numerical digit based on a random property of the quantum physical entities. Step 408. A variety of techniques may be implemented for generating a numerical digit based on the one or more quantum physical entities, including, for example, a polarization component of photons and the arrival times of photons.

The numerical digits generated from the QRNG may be further evaluated according to one or more testing criterion, such as an analysis to determine any bias associated with the numerical digits output from the QRNG. Step 410. Testing feedback based on the one or more testing criterion may be provided to the quantum preparation control unit, which may perform one or more adjustments based on the feedback. Step 412. For example, if the testing feedback is indicative of bias in the numerical digits being generated from the QRNG, the quantum preparation control unit may provide a control output to affect one or more operating parameters of the QRNG. As a result, the output of numerical digits from the QRNG may be controlled such that the numerical digits being output may be maintained to satisfy one or more performance criterion, such as a substantial lack of bias.

Directional terms, such as "vertical," "horizontal," "top," "bottom," "upper," "lower," "inner," "inwardly," "outer" and "outwardly," are used to assist in describing the invention based on the orientation of the embodiments shown in the illustrations. The use of directional terms should not be interpreted to limit the invention to any specific orientation(s).

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular.

The embodiments of the invention in which an exclusive property or privilege is claimed are defined as follows:

1. An adaptive random number generator comprising:
    a quantum preparation unit configured to generate one or more quantum physical entities, the quantum preparation unit including a quantum preparation control unit configured to control, based on feedback, one or more operating parameters of the quantum preparation unit to affect generation of the one or more quantum physical entities;
    an analysis unit operably coupled to the quantum preparation unit, the analysis unit configured to generate an indirect measurement of the one or more quantum physical entities without collapsing a quantum state of the one or more quantum physical entities, the analysis unit configured to generate the feedback based on the indirect measurement of the one or more quantum physical entities;
    a measurement unit configured to conduct a measurement of at least one property of the one or more quantum physical entities, the measurement unit configured to generate one or more numerical digits based on the measurement of the at least one property of the one or more quantum physical entities.

2. The adaptive random number generator of claim 1 wherein the quantum preparation unit includes a photon source operably coupled to a power source, wherein the operating parameters include at least one of an operating current, an operating voltage, a photon polarization angle, an intensity, and a wavelength.

3. The adaptive random number generator of claim 1 wherein the analysis unit is a quantum interrogation unit configured to evaluate the one or more quantum physical entities according to one or more criterion, wherein the feedback is indicative of the one or more quantum physical entities deviating from the one or more criterion.

4. The adaptive random number generator of claim 3 wherein the quantum interrogation unit is configured to conduct a plurality of weak-measurements on the one or more quantum physical entities to generate a quantum statistical distribution indicative of a mean quantum state of the one or more quantum physical entities.

5. The adaptive random number generator of claim 4 wherein the quantum interrogation unit is configured to compare the quantum statistical distribution to an expected quantum statistical distribution, wherein the feedback is indicative of the quantum statistical distribution deviating from the expected quantum statistical distribution.

6. The adaptive random number generator of claim 1 wherein the analysis unit is a testing unit configured to evaluate the one or more numerical digits according to one or more criterion, wherein the feedback is indicative of the numerical digits deviating from the one or more criterion.

7. The adaptive random number generator of claim 6 wherein the testing unit evaluates the one or more numerical digits to determine a bias associated with the one or more numerical digits, wherein the feedback is indicative of the bias.

8. The adaptive random number generator of claim 6 further comprising a quantum interrogation unit configured to conduct a plurality of weak-measurements on the one or more quantum physical entities to generate a quantum statistical distribution, wherein the feedback includes (a) interrogation unit feedback from the quantum interrogation unit based on the weak-measurements and (b) testing unit feedback from the testing unit indicative of the numerical digits deviating from the one or more criterion.

9. The adaptive random number generator of claim 8 wherein the quantum interrogation unit provides post-selected information indicative of at least one of the weak-measurements to the testing unit, wherein the testing unit correlates the information with numerical digits to evaluate the numerical digits according to the one or more criterion.

10. A self-correcting true random number generator (STRNG), said STRNG comprising:
a number generator configured to generate a sequence of numbers based on a plurality of quantum states associated respectively with a plurality of quantum physical entities, the number generator including a control unit configured to control, based on feedback, a statistical distribution of the generated sequence of numbers;
a quantum interrogation stage configured to generate interrogation stage feedback based on an indirect measurement of the plurality of quantum physical entities without collapsing the plurality of quantum states associated respectively with the plurality of quantum physical entities;
an analysis unit operably coupled to the number generator, the analysis unit configured to monitor the number generator to provide analysis unit feedback to the number generator, the analysis unit feedback being indicative of a deviation in an observed statistical distribution for the generated number sequence from an expected statistical distribution; and
wherein the analysis unit feedback and the interrogation stage feedback form the feedback provided to the number generator, and wherein the control unit of the number generator is configured to control the statistical distribution of the generated sequence of numbers based on the analysis unit feedback and the interrogation stage feedback.

11. The STRNG of claim 10 wherein the number generator includes a quantum preparation unit and a measurement unit;
wherein the quantum preparation unit is configured to generate the plurality of quantum physical entities, the quantum preparation unit including a quantum preparation control unit configured to control one or more operating parameters of the quantum preparation unit; and
wherein the measurement unit is configured to generate the sequence of numbers based on at least one property respectively associated with the one or more quantum physical entities.

12. A self-correcting quantum random number generator (SCQRNG), said SCQRNG comprising:
a quantum preparation unit configured to generate one or more quantum physical entities, the quantum preparation unit including a quantum preparation control unit configured to control one or more operating parameters of the quantum preparation unit based on feedback;
an analysis unit operably coupled to the quantum preparation unit, the analysis unit configured to conduct a plurality of weak-measurements on the one or more quantum physical entities without collapsing a quantum state of the one or more quantum physical entities, wherein the analysis unit determines a quantum statistical mean based on the plurality of weak-measurements, wherein the analysis unit provides the feedback to the quantum preparation unit such that the control unit of the quantum preparation control unit controls the one or more operating parameters based on the plurality of weak-measurements that do not collapse the quantum state of the one or more quantum physical entities; and
a measurement unit configured to generate one or more numerical digits based on at least one property of the one or more quantum physical entities.

13. The SCQRNG of claim 12 wherein the analysis unit is configured to post-select one or more of the weak-measurements to determine a quantum statistical mean.

14. The SCQRNG of claim 12 wherein the analysis unit is configured to tomographically reconstruct a quantum statistical distribution of the quantum physical entities.

15. A method of generating a random number, said method comprising:
generating one or more quantum physical entities;
interrogating the one or more quantum physical entities to generate feedback indicative of a deviation in a quantum statistical distribution of the quantum physical entities from an expected statistical distribution, wherein said interrogating includes conducting a weak-measurement of the one or more quantum physical entities without collapsing a quantum state of the one or more quantum physical entities; and
adjusting a first operating parameter based on the feedback based on the weak-measurement that does not collapse the quantum state of the one or more quantum physical entities, wherein the first operating parameter affects generation of the one or more quantum physical entities;
measuring at least one property of the quantum physical entities; and
generating at least one numerical digit based on the at least one property of the quantum physical entities.

16. The method of claim 15 further comprising:
evaluating the numerical digit according to one or more criteria to generate additional feedback; and
adjusting a second operating parameter based on the additional feedback, wherein the second operating parameter affects generation of the one or more quantum physical entities.

17. The method of claim 16 wherein the second operating parameter is the first operating parameter.

18. The method of claim 16 wherein said evaluating the numerical digit includes post-selecting weak-measurements from said interrogating the one or more quantum physical entities and correlating the post-selected weak-measurements with numerical digits to evaluate the numerical digits according to the one or more criterion.

19. The method of claim 15 wherein a photon source generates the one or more quantum physical entities, and wherein the first operating parameter includes at least one of a supply current to the photon source, a voltage supply to the photon sources, an intensity of the photon source, a wavelength of the photon source, and a polarization angle of the photon source.

* * * * *